United States Patent [19]

Sustic

[11] Patent Number: 5,723,546
[45] Date of Patent: Mar. 3, 1998

[54] LOW- AND HIGH-MOLECULAR WEIGHT AMORPHOUS POLYALPHAOLEFIN POLYMER BLENDS HAVING HIGH MELT VISCOSITY, AND PRODUCTS THEREOF

[75] Inventor: Andres Sustic, Odessa, Tex.

[73] Assignee: Rexene Corporation, Odessa, Tex.

[21] Appl. No.: 822,865

[22] Filed: Mar. 24, 1997

[51] Int. Cl.$^6$ ..................................................... C08L 23/00
[52] U.S. Cl. ........................................................... 525/240
[58] Field of Search ................................................. 525/240

[56] References Cited

U.S. PATENT DOCUMENTS

| | | | |
|---|---|---|---|
| 3,112,300 | 11/1963 | Natta et al. | 260/93.7 |
| 3,112,301 | 11/1963 | Natta et al. | 260/93.7 |
| 3,963,659 | 6/1976 | Binder et al. | 260/28.5 AS |
| 4,022,728 | 5/1977 | Trotter et al. | 260/27 R |
| 4,075,290 | 2/1978 | Denzel et al. | 260/897 A |
| 4,650,830 | 3/1987 | Yonekura et al. | 525/193 |
| 4,960,820 | 10/1990 | Hwo | 524/528 |
| 5,468,807 | 11/1995 | Tsurutani et al. | 525/240 |
| 5,478,891 | 12/1995 | Lakshmanan et al. | 525/240 |
| 5,512,625 | 4/1996 | Butterbach et al. | 524/490 |
| 5,539,056 | 7/1996 | Yang et al. | 525/240 |

OTHER PUBLICATIONS

Business Research Report. "Hot Melt Adhesives B149", p. 1 (1989).

A. Sustic et al., "Novel Amorphous Polyalphaolefins (APAO) in Hot Melt Adhesive Formulations," TAPPI Notes, pp. 193–200 (1991).

A. Sustic, et al., "On–Purpose Amorphous Polyalphaolefins Used in Hot Melt Adhesives," *J. Adh. Seal. Council*, 20(2):41 (1991).

Collette, J.W., et al., "Elastomeric Polypropylenes from Alumina–Supported Tetralkyl Group IVB Catalysts," *Macromolecules*, 22:3851–58 (1989).

*Primary Examiner*—Edward J. Cain
*Attorney, Agent, or Firm*—Pennie & Edmonds LLP

[57] ABSTRACT

A polymer blend having an open time including a high molecular weight average, predominantly atactic flexible polyolefin polymer having a heat of fusion of about 15 to 60 J/g, and a low molecular weight average, atactic polyolefin polymer having a heat of fusion of about 0.1 to 20 J/g, wherein the high molecular weight polymer and low molecular weight polymer are sufficiently miscible to impart a single glass transition temperature to the polymer blend, and the low molecular weight polymer is present in an amount sufficient to impart a melt viscosity of greater than about 8,000 cPs at room temperature and a crystallinity below about 25 J/g to the polymer blend. The invention further includes methods for preparing such polymer blends, and the products produced from the polymer blends, which are useful for hot melt adhesives, asphalt and bitumen applications such as roofing membranes, polymeric modifiers and the like.

20 Claims, No Drawings

LOW- AND HIGH-MOLECULAR WEIGHT AMORPHOUS POLYALPHAOLEFIN POLYMER BLENDS HAVING HIGH MELT VISCOSITY, AND PRODUCTS THEREOF

TECHNICAL FIELD

This invention relates to polymer blends of a low molecular weight ("LMW") amorphous polyalphaolefin ("APAO" or "APAO polymer") and a high molecular weight ("HMW") flexible polyolefin, or polyalphaolefin, polymer composition ("HMW APAO," "FPO" or "FPO polymer") having a high melt viscosity and open time. The invention also relates to products thereof for use in hot melt adhesives, asphalt and bituminous roofing compositions, polymeric modifiers, and the like.

BACKGROUND OF THE INVENTION

The use of hot melt adhesives as substitutes, or even replacements, for conventional solvent-based adhesives in various applications has been increasingly favored because of environmental concerns caused by the emission of volatile organic compounds (VOCs), the well-being of workers in the workplace, and faster setting times than solvent-based adhesives.

A variety of hot melt adhesive formulations, polymeric modifiers and other applications make use of an APAO (a thermoplastic polymer). In such formulations, it is important that the polymer exhibit such characteristics as a range of tightly controlled BROOKFIELD® melt viscosities (MVs), needle penetrations (NPs) and ring & ball softening points (RBSPs, or R & B SPs), controllable and predictable long open time (OTs), low temperature flexibility, adhesion to a variety of substrates and compatibility with a variety of tackifiers and waxes. It is desirable to use such raw materials with reproducible specifications to obtain consistent properties in the formulations used in adhesive and other formulations.

It is well known that crystalline polypropylene generally has an isotactic or syndiotactic structure, and that amorphous polymers, such as atactic polypropylene, generally have a considerable atactic structure having low crystallinity. U.S. Pat. Nos. 3,112,300 and 3,112,301, for example, describe isotactic polypropylene and provide structural formulae for isotactic and syndiotactic polypropylene polymers. The former is a straight chain of propylene units wherein the methyl groups are all aligned on one side of the polymer chain. In the latter, the methyl groups alternate from one side of the chain to the other. Atactic polypropylenes, on the other hand, have methyl chains randomly disposed on opposite sides of the polymer chain. In the isotactic and syndiotactic polypropylenes of the patents above, the regularity of structure tends to result in a more highly crystalline material. Atactic polypropylene polymers of low molecular weight typically result in gummy materials having minimal tensile strength. The isotactic or syndiotactic polymers have a variety of disadvantages, such as low elongation capabilities and no open time, due to their high crystallinity, making them undesirable in hot melt adhesive formulations.

Almost all of the polypropylene which is produced commercially is crystalline isotactic polypropylene. Conventional polymers of this type typically have a crystallinity, or heat of fusion, of 70 J/g or higher, and more typically 90 J/g or higher. These products are well known and have been the subject of many patents and articles.

APAO polypropylenes, which have very little strength, are used commercially in adhesives and as asphalt additives, for example. Conventional atactic polypropylenes that tend to have a crystallinity of less than 20 J/g typically have an extremely high melt flow rate of around 2,000 g/10 min. or higher (at 230° C.). Generally, these atactic polypropylene polyolefins are sticky, which limits their possible usage in commercial products. Conventional LMW APAOs have not found much use in certain applications where high tensile and elongation values are required, because these APAOs lack such characteristics.

High-molecular weight ("HMW") APAOs, such as amorphous propylene homo- and co-polymers, are important for their use in diverse products. The broad utility of these materials is due in large part to the unique combination of chemical and physical properties, such as chemical inertness, softness, flexibility, etc., exhibited by these materials. Amorphous, or atactic, polypropylene is different from crystalline polypropylenes in steric microstructure, and usually lacks tensile strength, for example. It is also known that the combination of different polymers to obtain polymer blends for particular uses, however, makes conventional blends that tend to have several disadvantages, such as low melt viscosities, immiscibility that imparts optical haziness and two independent melting points (mp) and/or glass transition temperatures ($T_g$), and poor or no open time.

Various references disclose conventional polymer blends, some of which are discussed below. U.S. Pat. No. 3,963,659 discloses homogeneous thermoplastic bituminous compositions containing up to 25 parts by weight of cross-linkable ethylene-$\alpha$-olefin rubber, and methods for preparing the same, to provide improved properties for use in asphalt applications. The cross-linkable rubbers in the bituminous compositions yield high tensile strength final products.

U.S. Pat. No. 4,022,728 discloses hot melt pressure sensitive adhesives made of blends of amorphous polyolefin, a LMW substantially amorphous polymer, a liquid tackifying resin, and crystalline polypropylene to provide good adhesive properties at low temperatures.

U.S. Pat. No. 4,075,290 discloses polymer blends having a major amount of isotactic polybutene-1 having a molecular weight of 500,000 to 1,750,000 with a minor amount of low-pressure ethylene with a polypropylene or butene-1 copolymer having a molecular weight of 200,000 to 350,000, where the blends allegedly exhibit excellent weldability and superior tear and rupture resistance.

U.S. Patent No. 4,650,830 discloses a thermoplastic elastomer composition allegedly having good injection fusion bondability and surface gloss properties made of an amorphous ethylene/$\alpha$-olefin copolymer and (i) a low crystallinity copolymer of propylene with an $\alpha$-olefin having at least 4 carbon atoms, (ii) a polymer composed mainly of 1-butene, or (iii) a combination of the low crystallinity copolymer or the mainly 1-butene polymer with a high crystallinity polymer made mostly of propylene and at least some of the components are crosslinked.

U.S. Pat. No. 4,960,820 discloses a blend of less than about 10 weight percent LMW, isotactic poly-1-butene polymer having a melt index of greater than 100 to 1000, and at least about 90 weight percent of a propylene polymer having a melt index of less than 60.

U.S. Pat. No. 5,468,807 discloses a resin composition including 20–80 weight percent of an amorphous polyolefin having a propylene and/or butene-1 component of at least 50 weight percent, and 20–80 weight percent of a crystalline polypropylene, which is allegedly well-balanced in mechanical strength and flexibility.

U.S. Pat. No. 5,478,891 discloses blended polymer compositions of (a) a HMW copolymer of ethylene and an alphaolefin having at least 4 carbons, and (b) an amorphous polypropylene and/or amorphous polyolefin, or mixtures thereof, for use in hot melt adhesives, coatings, sealants, asphalt or bitumen modifiers, and plastics additives. Component (a) is described as generally rigid at room temperatures and component (b) is described as having a molecular weight range of about 300 to 60,000, where the blends have a viscosity of between approximately 650 to 46,000 cPs.

U.S. Pat. No. 5,512,625 discloses a thermoplastic hot-melt adhesive from a polymer blend of (a) an oligomer of an alpha-olefin having at least eight carbon atoms in the monomer and an oligomer molecular weight of less than 5,000, and (b) a mixture of a substantially amorphous poly-alpha-olefin and a substantially crystalline poly-alpha-olefin to provide an allegedly improved impact strength, viscosity of between about 130 to 18,000 cPs from 180° C. to 200° C., and flexibility at low temperatures.

Thus, it would be advantageous to produce polyolefin blends having a combination of at least some of the following properties. One desired property includes a lower degree of crystallinity with a higher elongation and tensile strength than conventional APAOs or intra-APAO polymer blends. It is also desired to produce a polymer blend where the blend has a sufficiently high melt viscosity to provide tensile strength, yet has a low crystallinity and a high elongation capability. It is also desired to obtain polymer blends that have a sufficiently high "open time" to impart adhesive characteristics. It is also desired to produce a polymer blend using two miscible polymers having similar crystallinities, such that the resulting polymer blend has substantial transparency and a single $T_g$ and melting point, for example. These characteristics are desired in a polymer blend to create a class of polymers having a variety of new uses and improved capabilities, including hot melt adhesives, asphalt and bitumen applications such as roofing membranes, polymeric modifiers and the like.

SUMMARY OF THE INVENTION

The present invention relates to a polymer blend comprising a predominantly atactic flexible polyolefin polymer having a high weight average molecular weight ($\overline{M}_w$) of at least about 100,000 and a heat of fusion of about 15 to 60 J/g; and an atactic polyolefin polymer having a low number average molecular weight ($\overline{M}_n$) of below about 25,000 and a heat of fusion of about 0.1 to 20 J/g. Advantageously, the high molecular weight polymer and low molecular weight polymer are sufficiently miscible to impart a single glass transition temperature and an open time to the polymer blend, and the low molecular weight polymer is present in an amount sufficient to impart a melt viscosity of greater than about 8,000 cPs at room temperature and a crystallinity below about 28 J/g to the polymer blend.

The high molecular weight polymer preferably has a heat of fusion between about 18 to 50 J/g and a melt flow rate between about 0.3 g/10 min. to about 100 g/10 min. at 230° C. In a more preferred embodiment, the heat of fusion of the HMW APAO polymer is about 20 to 35 J/g and the melt flow rate is between about 0.4 g/10 min. to 50 g/10 min. The high molecular weight polymer preferably has a weight average molecular weight of between about 150,000 to 200,000 g/mol, and comprises units of propylene, a copolymer including propylene, or a mixture thereof. The low molecular weight polymer comprises units of ethylene, butene, propylene, or copolymers or mixtures thereof and a number average molecular weight of between about 4,000 to 16,000 g/mol.

The low molecular weight polymer is advantageously present in about 60 to 98 weight percent of the polymer blend, so that the glass transition temperature is between about –10° C. to –30° C. The melt viscosity is preferably between about 25,000 cPs to 300,000 cPs. Further, the open time of the polymer blend is greater than 10 seconds. If desired, the blend can include an additive of at least one filler, antioxidant, UV stabilizer, pigment, tackifier, wax, or plasticizer.

Additional aspects of the invention are directed to a molded product, a roofing component or an adhesive, each of which includes one of the polymer blends described above. In a preferred embodiment, the roofing component is a modified bitumen roofing membrane or a built-up roofing formulation.

Yet another embodiment of the invention relates to a method of preparing a polymer blend by combining a high weight average molecular weight, predominantly atactic flexible polyolefin polymer having a heat of fusion of about 15 to 60 J/g and a low number average molecular weight, atactic polyolefin polymer having a heat of fusion of about 0.1 to 20 J/g by heating the high molecular weight polymer and low molecular weight polymer until they are sufficiently miscible to impart a single glass transition temperature and an open time to the polymer blend, wherein the low molecular weight polymer is present in an amount sufficient to impart a melt viscosity of greater than about 8,000 cPs at room temperature and a crystallinity below about 28 J/g to the polymer blend.

DETAILED DESCRIPTION OF THE INVENTION

It has now been discovered that blending low crystallinity HMW APAOs (FPOs) with LMW APAOs provides the desired high melt viscosity, open time, tensile strength with a low crystallinity, and other desirable properties discussed herein. The polymer blends also have a high elongation and flexibility capability even at low temperatures, yet have superior high temperature resistance. The new polymer blends also have a sufficiently long "open time" to impart desired adhesive characteristics, and are substantially transparent (i.e., excellent clarity) and preferably have only one $T_g$ due to the miscibility of the two polymer components.

The APAO blends herein expand and increase the range of melt viscosities available in conventional polymer blends. As the molecular weight of the APAO blends increase, they become stiffer with improved tensile properties and higher elongation (tensile strain at break). Even though the melt viscosity and the crystallinity increase in the blends of the invention, the blends typically have closely controlled RBSP, OT, and melt viscosity properties. These blended products have improved holding power and shear adhesion failure temperature values, as well as good "green strength," which advantageously improves their desirability for hot melt adhesive applications, polymeric modifiers, roofing components, such as a modified bitumen roofing membrane or a built-up roofing formulation, and in asphalt and other modified bitumen applications.

Several different families of propylene-based polymers, for example, may be used for the preparation of the polymer blends of the present invention. Some examples of these APAO polymer families include, but are not limited to: APAO propylene homopolymers, APAO propylene/ethylene copolymers, APAO propylene/butene copolymers, FPO propylene homopolymers, FPO propylene/ethylene copolymers, and FPO propylene/butene copolymers.

Typically, any combination of ethylene, propylene, and butene may be used in the LMW or HMW APAO (FPO) polymers that are combined to form the polymer blend.

The LMW APAO polymer used in the blend may be any of the polymer families described above, provided the polymer has the appropriate characteristics discussed herein, such as molecular weight, crystallinity, melt viscosity, and the like. Preferably, the LMW APAO polymer predominantly includes ethylene, propylene, butene, or copolymers or mixtures thereof. More preferably, the LMW APAO polymer is an ethylene/propylene copolymer or a butene/propylene copolymer, and most preferably, the LMW APAO polymer is about 1 to 20 weight percent ethylene and about 80 to 99 weight percent propylene copolymer or about 10 to 70 weight percent butene, preferably 30 to 65 weight percent butene, in a copolymer with about 90 to 30 weight percent propylene, preferably about 70 to 35 weight percent propylene. The LMW APAO polymer preferably has a number average molecular weight of about 4,000 to 16,000 g/mol, more preferably about 6,000 to 12,000 g/mol, and most preferably about 8,000 to 12,000 g/mol. The LMW APAO polymer has a crystallinity, or heat of fusion, of about 0.1 to 20 J/g, preferably about 0.5 to 15 J/g, more preferably about 1 to 10 J/g, as measured by DSC (ASTM D-3417). Moreover, the LMW APAO may typically be chosen from a broad range of melt viscosities ranging from about 400 to 20,000 cPs (at 190° C.). As higher melt viscosities are a desired characteristic in the polymer blend and products produced therefrom, it is preferred to use higher melt viscosities in the LMW APAO. The REXTAC® (LMW APAO) series of polymers, as well as various other polymers discussed herein, are commercially available from Rexene Corporation of Odessa, Tex. and are useful for the LMW APAO portion of the polymer blends.

Any of the polymer families listed above may be also used for the HMW APAO (FPO) polymer, provided the family has the appropriate characteristics discussed herein, such as molecular weight, crystallinity, melt flow rate, and the like. The FPO-type polymers, including polymers of predominantly ethylene, propylene, butene, or copolymers or mixtures thereof, are preferred for the HMW APAO (FPO) polymer used in the polymer blend, as they are characterized by a variety of desirable properties described herein. The most important of these properties are the degree of crystallinity and the degree of polymerization, as measured by the heat of fusion and the melt flow rate. Heat of fusion ($\Delta H_f$) is typically measured by DSC using an ASTM standard method. The FPO polymers (HMW APAOs) of the present invention have a heat of fusion that may range from about 15 to 60 J/g and a melt flow rate of between about 0.3 to 100 g/10 min. (at 230° C.). Manufactured products produced with the FPO polymers alone advantageously tend to feel softer, smoother, and more silky to the touch, rather than being more rigid and drier to the touch, as with products produced using conventional isotactic polypropylenes.

The FPO polymers used in the blend typically have a $\overline{M}_n$ of about 15,000 g/mol to 30,000 g/mol, preferably about 20,000 to 25,000 g/mol, and more preferably about 21,000 to 24,000 g/mol. The specific $\overline{M}_n$ will vary depending upon the particular HMW APAO used, which depends upon the desired final properties and applied use for the polymer blend. The weight average molecular weight will vary more dramatically depending upon the HMW APAO used, although it is generally over 100,000, preferably between about 130,000 g/mol to 230,000 g/mol and more preferably between about 150,000 to 200,000 g/mol.

The use of FPO polymers having low crystallinity, which may be prepared by using a catalyst system that produces polymers with well-defined physical properties, facilitates the production of polymer blends having the reproducible specifications required of adhesive formulations and other uses. Such a catalyst system, and a variety of low crystallinity, HMW APAO polymers produced thereby and suitable for use in the present invention, are disclosed in copending U.S. patent application Ser. No. 08/779,762, the disclosure of which is expressly incorporated herein by reference thereto.

The polymers disclosed therein are preferred HMW APAOs for use in the polymer blends of the present invention, as they advantageously have a low crystallinity required for the present invention in the range of about 15 to 60 J/g while also having a melt flow rate of between about 0.3 to 100 g/10 min, and every whole integer therebetween. Preferably, the melt flow rate (at 230° C.) of the HMW APAOs of the present invention is between about 0.4 to 50 g/10 min., more preferably between about 0.5 to 20 g/10 min., and most preferably between about 1 to 15 g/10 min, and every whole integer therebetween. The MFR may be varied accordingly by varying the catalyst recipe, as disclosed therein. These HMW APAO ("FPO polymers") polymers, also described as flexible polyolefins, are advantageously produced by the use of a catalyst containing a pro-catalyst capable of imparting to a polymer a crystallinity as low as about 15 J/g and a low melt flow rate, an organometallic compound, and, optionally, an external modifier that is capable of increasing the low crystallinity up to as high as 60 J/g, depending upon the amount and type of regiocontrolling external modifier included in the catalyst.

A variety of these preferred HMW APAO polymers are available from Rexene Corporation, Odessa, Tex. under the "FPO polymer" or "FPD" designations, such as FPD-100, FPD-400, FPD-2300, FPD-1700, FPD-1710, FPD-1720, FPD-1800, FPD-1810, and FPD-1820. All of these HMW APAO polymers have a crystallinity between about 15 to 65 J/g and all are preferred HMW APAOs for use herein, although the FPD-100, FPD-400, and FPD-2300 are more preferred types of HMW APAO polymers.

Although a crystallinity, or heat of fusion, of between about 15 to 60 J/g is suitable for use in the polymer blends of the invention, it is preferred to use a HMW APAO having a lower degree of crystallinity to impart a reduced crystallinity in the polymer blend. Preferably, the heat of fusion is between about 18 to 50 J/g, more preferably it is between about 20 to 35 J/g, and most preferably the heat of fusion is between about 22 to 30 J/g.

The HMW APAOs, preferably elastomeric, with high melt viscosity values and low crystallinity, are blended with the LMW APAOs, which also preferably have a high melt viscosity, to obtain the desired characteristics described herein.

These individual polymers, as well as blends produced thereby, may be characterized following standard test methods set forth by the American Society for Testing and Materials (ASTM) that are widely used in the hot melt adhesives industry. These test methods generally are as follows.

Melt viscosity, MV (cPs or mPa•s), is typically determined according to ASTM D-3236, and it measures a liquid or molten polymer's internal friction, i.e., its resistance to flow. This distinctive property determines the flowability and degree of wetting, or penetration, of a substrate by the molten polymer; it provides an indication of its processability. Melt viscosity is generally directly related to a polymer's molecular weight, and it is reported in millipascal×sec (mPa*sec.), or centipoise, using a BROOKFIELD® THERMOSEL RVT VISCOMETER.

Needle penetration, NP (dmm) is usually measured according to ASTM D-1321. With thermoplastics and elastomers, this test method, which measures the depth to which a weighted needle penetrates the polymer surface and determines the resistance of the polymer to deformation by penetration, is often used as a simple measure of stiffness (or softness).

Ring and ball softening point, RBSP (° C./° F.), is typically measured according to ASTM E-28. Due to the predominantly amorphous nature of the APAO polyolefins herein, melting does not take place at a sharp, definite temperature. Rather, as the temperature increases, these APAO polymers gradually change from solid to soft and then to liquid materials. This test method generally measures the precise temperature at which a disc of polymer sample submerged in a glycerine bath and heated at a rate of 5.5° C./min. (10° F./min.) becomes soft enough to allow the test object, a steel ball, to drop through the sample. The softening point of a polymer, reported in ° C. (° F.) is important, because it typically indicates the polymer's heat resistance, application temperature and solidification point.

Open Time, OT (sec), is typically measured by ASTM D-4497, which measures the time, in seconds, between application of a thin film of the hot melt adhesive and the time just prior to the hot melt film losing its wetting ability (adhesiveness) because of solidification. More particularly, this may be measured by drawing down a thin film of polymer and applying one-inch wide strips of paper onto the film with a two-pound roller at specific time intervals. Generally, the paper strips are applied at 10, 20, 40, 60, 90, 120, and 240 seconds after film draw-down. After waiting for approximately five (5) minutes, the paper strips are pulled off of the film. When the paper tears, an open time exists. Under the ASTM method, at least 50 percent of the paper must remain for there to be an open time. However, under the more stringent REXENE® method used in this application, at least 90 percent of the fiber must remain on the polymer.

Other standard test methods were used to determine the polymer's heat of fusion and melting point (ASTM D-3417), glass transition temperature (ASTM D-3418) and tensile properties (ASTM D-638).

The polymer blends of the present invention may be prepared by any conventional or other suitable method of combining polymers. For example, the LMW APAO and HMW APAO may be combined by mixing in a batch mixer or kneading with a sigma blade kneader, which is named after its sigma-shaped blade that virtually scrapes the sides of the container to facilitate blending of the polymer. Selection of the LMW and HMW APAO polymers is crucial to obtain the polymer blends of the invention, of course, although to be properly blended the APAOs must simply be in a molten state when combined by mixing or kneading. Another suitable way to combine the LMW and HMW APAOs is in an extruder. When extrusion is used, the APAO polymers should be heated above the softening point. Naturally, the temperature at which the LMW and HMW APAOs become molten or soft will vary according to the particular APAOs selected. It is to be understood that once polymers have been selected, one of ordinary skill in the art is capable of determining the temperature at which the polymers will become molten or soft as required for proper mixing.

The polymer blends typically contain about 2 to 40 weight percent of the HMW APAO polymer with about 60 to 98 weight percent LMW APAO polymer. Preferably, the polymer blends contain about 5 to 35 weight percent of the HMW APAO, more preferably about 10 to 30 weight percent of the HMW APAO, with the remainder being LMW APAO. One or both of the HMW and LMW APAO polymers may be correspondingly reduced if an additive is included in up to about 5 weight percent of the total polymer blend.

The polymer blends of the present invention may be described by various characteristics, which are set forth below. For example, it is desired that the polymer blends have a broad molecular weight distribution. A high tensile stress at break is desired, and this value is typically about 20 psi to 800 psi, preferably about 50 psi to 700 psi, and more preferably about 100 psi to 600 psi. A large open time is desired, typically at least about 10 seconds, preferably at least about 30 seconds, more preferably at least about 50 seconds, and most preferably at least about 100 seconds. A high melt viscosity is additionally desired, typically between about 8,000 to 340,000 cPs, preferably between about 15,000 to 320,000 cPs, more preferably between about 25,000 to 300,000 cPs, and most preferably between about 50,000 to 250,000 cPs, and every thousand integer therebetween.

The melting point of the polymer blends are typically between about 95° C. to 155° C., preferably about 137° C. to 153° C., and more preferably about 139° C. to 151° C. The preferred polymer blends are those where only one melting point exists, indicating the LMW and HMW APAO polymers are substantially miscible. The most preferred polymer blends exhibit only one melting point, which falls within the more preferable melting point range, and the blends contain minimal, if any, cross-linking. The $T_g$ is an even better indicator of miscibility between the HMW and LMW APAOs than the melting point, and the $T_g$ is typically between about $-5°$ C. to $-35°$ C., preferably between about $-10°$ C. and $-30°$ C., and more preferably between about $-15°$ C. to $-25°$ C. The optical appearance of the polymer blends is important, as well, with substantially clear blends being preferred. The use of substantially miscible HMW and LMW APAOs in the polymer blends will substantially reduce the haziness typically found in blends of incompatible polymers.

The polymer blends are relatively soft, and are thus measured on the Shore A scale at between about 40 to 80, preferably between about 50 to 70, and more preferably between about 55 to 65. On the Shore D scale, the polymer blends of the present invention are typically between about 6 to 14, preferably between about 7 to 13, and more preferably between about 8 to 12. The tensile strain at break is typically between about 30 percent elongation for lower MW polymer blends to a "no break" strain, i.e., there is no break in the polymer blend at approximately 310 percent elongation. Although the blends are fairly soft, the tensile modulus at 23° C. is between about 500 psi to 20,000 psi, or roughly 100 to 1,400 kg/cm². Preferably, the tensile modulus is between about 750 psi to 15,000 psi, and more preferably between about 1,000 psi to 10,000 psi.

The polymer blends also have a relatively low crystallinity, typically having a heat of fusion below about 28 J/g, preferably below about 20 J/g, and more preferably below about 10 J/g. Such blends are typically obtained by using a HMW APAO component having a low crystallinity.

Various additives may be included in either or both of the LMW or HMW APAO polymers, or during the mixing to form the polymer blend, such as antioxidants, UV stabilizers, pigments, tackifiers, waxes, plasticizer, and the like. Adding or removing hydrogen during the polymerization described herein may affect the MFR of the FPO polymers, while having minimal impact on the degree of crystallinity. The effects of hydrogen addition or removal are known and understood by those of ordinary skill in the art.

7.5 weight percent ethylene and 92.5 weight percent propylene. FPD-100 HMWAPAO has a heat of fusion of approximately 23–27 J/g. FPD-400 HMW APAO has a heat of fusion of approximately 17–20 J/g. FPD-2300 HMWAPAO has a heat of fusion of approximately 33–37 J/g. The heats of fusion are provided as ranges, because they vary slightly depending upon the determination method. The characteristics of a LMW APAO polymer (Example 1) and various LMW APAO and HMW APAO polymer blends of the invention (Examples 2–11) are set forth in Table I below.

TABLE 1

Physical and Mechanical Properties of High Melt Viscosity Ethylene/Propylene APAOs

| Polymer type (wt %) | MV (cPs) mPa x s | NP (dmm) | R & B SP °C. (°F.) | OT (sec) | Tens. Mod. MPa (psi) | Tens. Strain @ Break (%) | $T_g$ (°C.) | H.F. (°C.) | mp (°C.) |
|---|---|---|---|---|---|---|---|---|---|
| 100% REXTAC ® 2385 | 8,500 | 20 | 141 (285) | 20 | 6.9 (1000) | 55 | −29 | <5 | 139 |
| 97.5% 2385/ 2.5% FPD-400 | 10,800 | 21 | 141 (286) | 10 | (1000) | 56 | −20 | 6.8 | 140.4 |
| 92.5% 2385/ 7.5% FPD-400 | 21,000 | 18 | 142 (288) | 10 | 7.6 (1100) | 45 | −20 | 7 | 142.4 |
| 85% 2385/ 15% FPD-400 | 50,800 | 17 | 149 (300) | 10 | (1600) | 150 | −20 | 12.1 | 140.3 |
| 80% 2385/ 20% FPD-400 | 81,000 | 17 | 149 (301) | 10 | (1600) | 125 | −19 | 14.3 | 140.1 |
| 85% 2385/ 15% FPD-100 | 51,000 | 17 | 149 (300) | 10 | 11.0 (1600) | 150 | −20 | 12 | 141.2 |
| 80% 2385/ 20% FPD-100 | 81,000 | 17 | 149 (301) | 10 | 11.0 (1600) | 125 | −20 | 14 | 136.5 |
| 97.5% 2385/ 2.5% FPD-2300 | 12,400 | 28 | 138 (280) | 10 | (1780) | 60 | — | 5.9 | 140.6 |
| 90% 2385/ 10% FPD-2300 | 37,300 | 18 | 151 (304) | 10 | (1700) | 87 | — | 11.2 | 145.6 |
| 80% 2385/ 20% FPD-2300 | 165,000 | 14 | 158 (316) | 0 | 23.4 (3400) | 120 | −19 | 19 | 152.4 |
| 65% 2385/ 35% FPD-400 | 205,000 | 10 | 158 (316) | 0 | 15.2 (2200) | 265 | −18 | 14 | 145 |

EXAMPLES

The invention is further defined by reference to the following examples describing in detail the preparation of the polymer blends of the present invention. It will be apparent to those skilled in the art that many modifications, both to materials and methods, may be practiced without departing from the purpose and interest of this invention.

EXAMPLES 1–11: LMW Ethylene/Propylene Copolymer Blended with HMW Propylene

LMW APAO ethylene/propylene copolymer was blended with low crystallinity, HMWAPAO propylene (FPD designation) to form certain polymer blends of the present invention. The REXTAC® 2385 is a LMWAPAO of about

EXAMPLES 12–19: LMW 1-Butene/Propylene Blended with HMW Propylene

LMW APAO 1-butene/propylene copolymer was blended with low crystallinity, HMWAPAO propylene (FPD designation) to form certain polymer blends of the present invention. The REXTAC® 2780 is a LMW APAO of about 35 weight percent 1-butene and 65 weight percent propylene copolymer. The FPD-100, -400, and -2300 have heats of fusion as discussed above. The characteristics of a LMW APAO 1-butene/propylene copolymer (Example 12) and various LMW APAO and HMW APAO polymer blends of the invention (Examples 13–19) are set forth in Table II below.

TABLE II

Physical and Mechanical Properties of High Melt Viscosity 1-Butene/Propylene APAOs

| Polymer type (wt %) | MV (cPs) mPa x s | NP (dmm) | R & B SP °C. (°F.) | OT (sec) | Tens. Mod. MPa (psi) | Tens. Strain @ Break (%) | $T_g$ (°C.) | H.F. (°C.) | mp (°C.) |
|---|---|---|---|---|---|---|---|---|---|
| 100% REXTAC® 2780 | 8,000 | 25 | 107 (225) | 240 | 3.5 (500) | 130 | −23 | <2 | 83 |
| 97.5% 2780/ 2.5% FPD-400 | 11,200 | 33 | 111 (232) | 210 | (1200) | 106 | −19 | <2 | 89.8 |
| 92.5% 2780/ 7.5% FPD-400 | 16,000 | 32 | 123 (254) | 160 | 6.2 (900) | 81 | −19 | <2 | 98, 146.9 |
| 90% 2780/ 10% FPD-400 | 28,500 | 25 | 139 (282) | 140 | 6.9 (1000) | 315 | −18 | 4.3 | 104.5, 146.2 |
| 80% 2780/ 20% FPD-400 | 70,000 | 17 | 144 (291) | 100 | (1700) | N.B. | −17 | 6.3 | 101.4 |
| 90% 2780/ 10% FPD-2300 | 37,000 | 23 | 154 (310) | 60 | (1900) | 142 | — | 2.2 | 152 |
| 85% 2780/ 15% FPD-2300 | 70,000 | 17 | 144 (291) | 120 | 11.7 (1700) | N.B. | −17 | 6.3 | 153 |
| 80% 2780/ 20% FPD-2300 | 145,000 | 15 | 158 (316) | 20 | 17.2 (2500) | N.B. | −16 | 8 | 153.3 |

N.B. = NO BREAK @ 311% ELONGATION

EXAMPLES 20-26: LMW 1-Butene/Propylene Blended with HMW Propylene

LMW APAO 1-butene/propylene copolymer was blended with low crystallinity, HMWAPAO propylene (FPD designation) to form certain polymer blends of the present invention. The E21 polymer is a LMW APAO of about 65 weight percent 1-butene and 35 weight percent propylene copolymer. The FPD-100, -400, and -2300 have heats of fusion as discussed above. The characteristics of a LMW APAO 1-butene/propylene copolymer (Example 20) and various LMW APAO and HMW APAO polymer blends of the invention (Examples 21-26) are set forth in Table III below.

polymers. The FPD-100, -400, and -2300 have heats of fusion as discussed above. The characteristics of these blends were examined and, although generally having lower tensile strain at break, they were generally found to be softer, have a higher NP, and have a longer open time than the corresponding amount of HMWAPAO of Examples 1-11.

Although preferred embodiments of the invention have been described in the foregoing description, it will be understood that the invention is not limited to the specific embodiments disclosed herein but is capable of numerous modifications by one of ordinary skill in the art. It will be understood that the materials used and the chemical details may be slightly different or modified from the descriptions

TABLE III

Physical and Mechanical Properties of High Melt Viscosity, 1-Butene/Propylene APAOs

| Polymer type (wt %) | MV (cPs) mPa x s | NP (dmm) | R & B SP °C. (°F.) | OT (sec) | Tens. Mod. MPa (psi) | Tens. Strain @ Break (%) | $T_g$ (°C.) | H.F. (°C.) | mp (°C.) |
|---|---|---|---|---|---|---|---|---|---|
| 100% E21 LMW APAO | 3,750 | 7 | 90 (195) | 300 | 82.7 (12,000) | 20 | −28 | <2 | — |
| 95% E21/ 5% FPD-400 | 11,100 | 9 | 113 (235) | 240 | 83.4 (12,100) | 305 | −25 | 9 | 76 |
| 90% E21/ 10% FPD-400 | 15,500 | 9 | 123 (253) | 180 | 123 (17,900) | 271 | −25 | 27 | 72.2 |
| 85% E21/ 15% FPD-400 | 22,500 | 8 | 135 (275) | 150 | 84.1 (12,200) | N.B. | −25 | 13 | 70.9 |
| 80% E21/ 20% FPD-100 | 37,500 | 8 | 152 (305) | 60 | 93.1 (13,500) | N.B. | −25 | 18 | 70.9, 150.5 |
| 85% E21/ 15% FPD-2300 | 53,500 | 8 | 156 (313) | 60 | 110 (16,000) | N.B. | −25 | 21 | 71.5, 153.2 |
| 80% E21/ 20% FPD-2300 | 103,000 | 8 | 157 (315) | 40 | 138 (20,000) | N.B. | −23 | 23 | 71.4, 153.4 |

N.B. = NO BREAK @ 311% ELONGATION

EXAMPLE 27: LMW Ethylene/Propylene Blended with HMW Propylene

LMW APAO ethylene/propylene copolymer was blended with various amounts of low crystallinity, HMW APAO propylene (FPD designation) to form certain polymer blends of the present invention. REXTAC® 2585, is a LMW APAO of about 15 weight percent ethylene and 85 weight percent propylene copolymer. The REXTAC® 2585 LMWAPAO portion was blended with various amounts of HMW APAO herein without departing from the methods and compositions disclosed and taught by the present invention.

What is claimed is:

1. A polymer blend comprising:

a predominantly atactic flexible polyolefin polymer having a high weight average molecular weight of at least about 100,000 and a heat of fusion of about 15 to 60 J/g; and an atactic polyolefin polymer having a low number average molecular weight of below about 25,000 and a heat of fusion of about 0.1 to 20 J/g, wherein the high molecular weight polymer and low molecular weight polymer are sufficiently miscible to impart a single glass transition temperature and an open time to the polymer blend, and the low molecular weight polymer is present in an amount sufficient to impart a melt viscosity of greater than about 8,000 cPs at room temperature and a crystallinity below about 28 J/g to the polymer blend.

2. The blend of claim 1, wherein the high molecular weight polymer has a heat of fusion between about 18 to 50 J/g and a melt flow rate between about 0.3 g/10 min. to about 100 g/10 min. at 230° C.

3. The blend of claim 2, wherein the heat of fusion is between about 20 to 35 J/g and the melt flow rate is between about 0.4 to 50 g/10 min.

4. The blend of claim 1, wherein the high molecular weight polymer has a weight average molecular weight of between about 150,000 to 200,000 g/mol.

5. The polymer of claim 1, wherein the high molecular weight polymer comprises units of propylene, a copolymer including propylene, or a mixture thereof.

6. The blend of claim 1, wherein the low molecular weight polymer comprises units of ethylene, butene, propylene, or copolymers or a mixture thereof.

7. The blend of claim 1, wherein the low molecular weight polymer has a number average molecular weight of between about 4,000 to 16,000 g/mol.

8. The blend of claim 1, wherein the low molecular weight polymer is present in about 60 to 98 weight percent of the polymer blend.

9. The blend of claim 1, wherein the glass transition temperature is between about −10° C. to −30° C.

10. The blend of claim 1, wherein the melt viscosity is between about 25,000 cPs to 300,000 cPs.

11. The blend of claim 10, wherein the melt viscosity is between about 50,000 to 250,000 cPs.

12. The blend of claim 1, wherein the crystallinity is between about 0.2 to 20 J/g.

13. The blend of claim 1, wherein the open time of the polymer blend is greater than 10 seconds.

14. The blend of claim 1, wherein the open time of the polymer blend is greater than 50 seconds.

15. The blend of claim 1, further comprising an additive of at least one filler, antioxidant, UV stabilizer, pigment, tackifier, wax, or plasticizer.

16. A molded product comprising the polymer blend of claim 1.

17. A roofing component comprising the polymer blend of claim 1.

18. A hot melt adhesive comprising the polymer blend of claim 1.

19. The adhesive of claim 18 disposed on at least one side of a laminar article.

20. A method of preparing a polymer blend comprising combining a high weight average molecular weight, predominantly atactic flexible polyolefin polymer having a heat of fusion of about 15 to 60 J/g and a low number average molecular weight, atactic polyolefin polymer having a heat of fusion of about 0.1 to 20 J/g by heating the high molecular weight polymer and low molecular weight polymer until they are sufficiently miscible to impart a single glass transition temperature and an open time to the polymer blend, wherein the low molecular weight polymer is present in an amount sufficient to impart a melt viscosity of greater than about 8,000 cPs at room temperature and a crystallinity below about 28 J/g to the polymer blend.

* * * * *